UNITED STATES PATENT OFFICE.

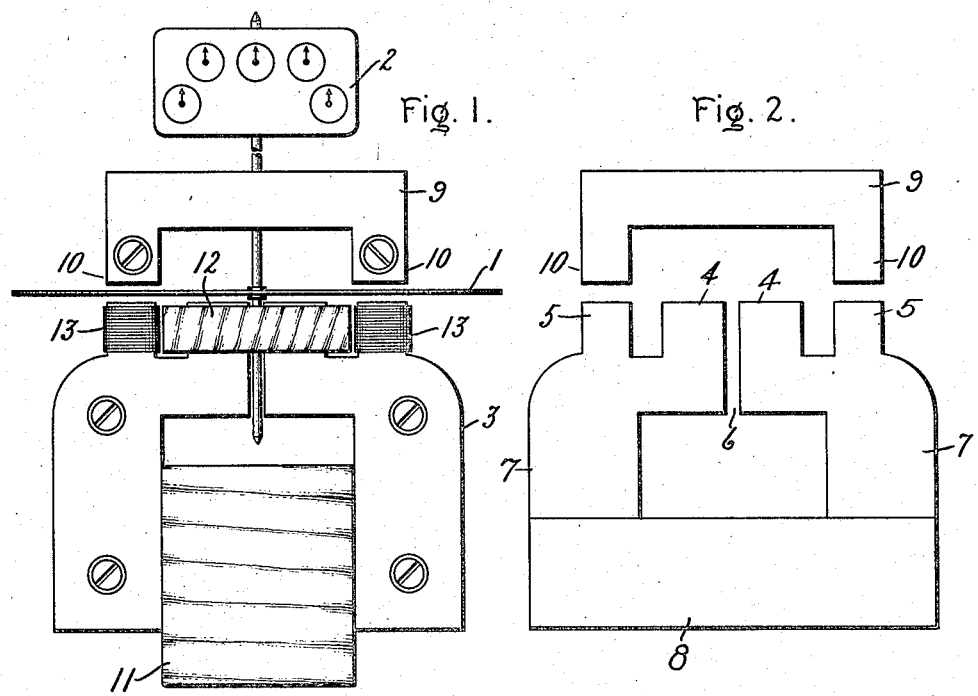
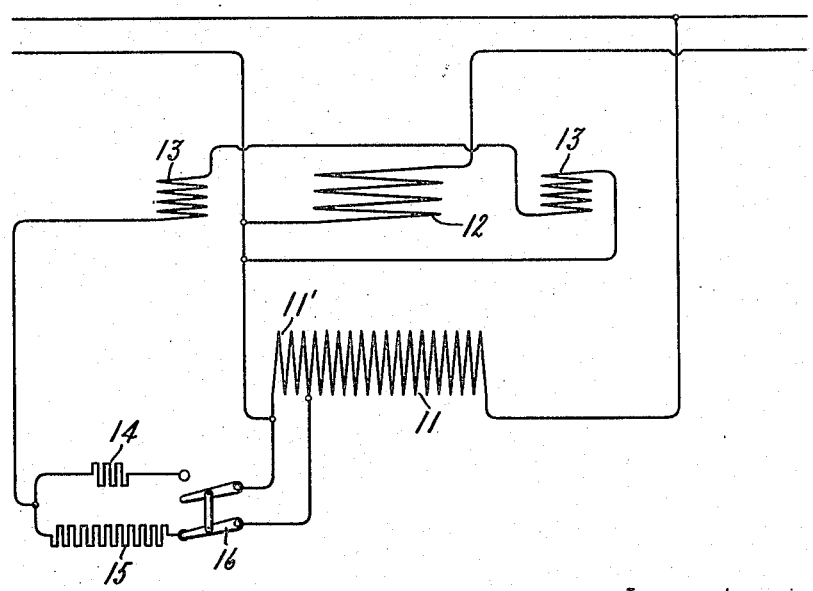

PETER C. MORGANTHALER, OF FORT WAYNE, INDIANA, ASSIGNOR TO FORT WAYNE ELECTRIC WORKS, A CORPORATION OF NEW YORK.

ELECTRIC METER.

941,459.  Specification of Letters Patent.  Patented Nov. 30, 1909.

Application filed May 22, 1909.  Serial No. 497,663.

*To all whom it may concern:*

Be it known that I, PETER C. MORGANTHALER, a citizen of the United States, residing at Fort Wayne, county of Allen, State of Indiana, have invented certain new and useful Improvements in Electric Meters, of which the following is a specification.

My invention relates to wattmeters of the induction type, and has for its object the improvement in the construction of such meters.

The novelties of my invention are pointed out with more particularity in the claims annexed to and forming a part of this specification.

For a further understanding of my invention reference may be had to the drawings, in which—

Figure 1 shows diagrammatically a vertical view of a meter; Fig. 2 shows the shape and arrangement of the magnetic circuits; and Fig. 3 shows the connections which I employ with my meter.

Referring first to Fig. 1, I have shown a revoluble armature 1 of the usual type arranged in any suitable manner to drive the gear train 2 for the registration of the energy consumed in the circuit to which the meter is connected. In operative relation the armature is a U-shaped core 3. Referring to Fig. 2, this core is shown as made up of two end-members 7 connected by a member 8. This core is made of such a shape that it has double poles 4, 5, the inner poles being separated by the air-gap 6, so that the greater portion of the flux produced in the core will pass across this gap for the purpose well understood by those skilled in the art. In operative relation with the armature and the U-shaped core 3, and placed on the opposite side of the armature from the core 3, is a C-shaped member 9 having its ends 10 substantially opposite the outer poles 5 of the core 3. Energizing U-shaped core 3 is a potential coil 11, which is carried by the core. Surrounding the inner poles 4 is a series coil 12, and surrounding each of poles 5 are lagging coils 13.

Referring now to Fig. 3, the potential coil 11 is shown as connected in the usual manner across the conductors of the circuit whose energy it is desired to measure, and coil 12 is shown as connected in series with one conductor of the circuit; but it is obvious that coil 12 may be connected across a shunt in the main circuit for the purpose of reducing the current flowing through the coil in the manner well understood by those skilled in the art, or that the usual series and potential transformers may be used for energizing the current and potential coils. Coils 13 are shown as connected in series, and connections are shown so that these coils may be connected across portions of the potential winding 11', or they may be connected in a closed circuit upon themselves.

A resistance 14 is adapted to be in series with the coils when they are short-circuited upon themselves for the purpose of producing the proper lag in the circuit in the manner well understood by those skilled in the art, and a resistance 15 is shown adapted to be in series with the coils when they are energized from the portion of the potential winding. The connections of the coils may be altered by means of any suitable device, such as a switch 16, which is adapted to connect coils 13 across the potential winding or to short-circuit them upon themselves. The object of these connections is to produce a proper amount of lag when the meter is operated upon circuits of varying frequency. If a low frequency be used, the field of the shunt coil will lag almost but not quite ninety degrees behind the field of the current coils for unity power factor, and in order to produce the proper ninety-degree lag, coils 13 are short-circuited upon themselves through the resistance 14, which will be of such a value as to produce the proper phase relation. At a higher frequency, the potential field will lag more than ninety degrees behind the field of the series coil, and proper compensation is made by energizing the lagging coils from a portion of the potential coil in the manner which is well understood by those skilled in the art.

While I have described my invention as applied to a particular form of construction and connection of the meter circuits, I do not limit myself to such form or connections, but seek in the appended claims to cover all forms and connections which will be within the spirit of my invention, and will be obvious to those skilled in the art.

What I claim as new, and desire to secure by Letters Patent of the United States, is:—

1. In an alternating-current meter, a U- shaped core having double poles, a potential coil carried thereby, a series coil surrounding the inner poles of the core, and lagging coils surrounding the outer poles of the core.

2. In an alternating-current meter, a U-shaped core having double poles with an air-gap between the inner poles, a potential coil energizing the core, a series coil surrounding the inner poles, a coil on each of the outer poles, and a C-shaped magnetic member having its ends in operative relation with the outer poles.

3. In an alternating-current meter, a revoluble armature, a U-shaped core in operative relation therewith having double poles with an air-gap between the inner poles, a potential coil energizing the core, a series coil surrounding the inner poles, coils connected in series surrounding the outer poles, means for altering the lagging effect produced by the coils with varying frequencies, and a C-shaped member having its ends in operative relation with the armature and the outer poles of the U-shaped core.

4. In an alternating-current meter, a revoluble armature, a U-shaped core in operative relation therewith having double poles with an air-gap between the inner poles, a potential coil energizing the core, a series coil surrounding the inner poles, a resistance, coils connected in series surrounding the outer poles, connections for connecting the coils across a portion of the potential coil or in series with the resistance, and a C-shaped member in operative relation with the armature and the outer poles of the U-shaped core.

In witness whereof, I have hereunto set my hand this 14th day of May, 1909.

PETER C. MORGANTHALER.

Witnesses:
   E. A. WAGNER,
   JAMES J. WOOD.